June 3, 1958 — E. A. GLASSEY — 2,837,706
LINE FOLLOWING SERVOSYSTEM
Filed Sept. 27, 1956

INVENTOR.
EUGENE A. GLASSEY
BY
ATTORNEYS

United States Patent Office 2,837,706
Patented June 3, 1958

2,837,706

LINE FOLLOWING SERVOSYSTEM

Eugene A. Glassey, Mountain View, Calif.

Application September 27, 1956, Serial No. 612,568

5 Claims. (Cl. 318—31)

(Granted under Title 35, U. S. Code (1952), sec. 266)

The invention described herein may be manufactured and used by or for the Government of the United States of America for governmental purposes without the payment of any royalties thereon or therefor.

This invention relates to mechanical function generators of the curve follower type and more particularly to such a function generator employing a potentiometer as the sensing element.

Function generators are employed in many different applications, such as in control systems for machine tools, fire control apparatus, and in uses requiring the storage and handling of complex equations, conversion factors and the like. Essentially function generators consist of a curve representing a plotted value mounted on a movable support and having means for following the curve, the output information in one type of function generator being the position of a mechanical element, and in another type of function generator being a voltage.

While prior art devices of this type have proven to be satisfactory for general uses there are certain inherent disadvantages when employed in applications requiring a high degree of resolution and accuracy, such as in functions of asymptotic or comparable nature. Among the disadvantages are a narrow linear response range, and a tendency of the servo system to hunt about a null position causing an undesirable instability. Furthermore, function generators capable of increased precision are complex and include costly electronic components. In the preferred embodiment the conductive curve is mounted on a rotatable cylinder of sufficient length to accommodate a number of turns of the curve enabling the function to be stretched out to enhance the accuracy of resolution. The curve follower is mounted for rectilinear movement along the cylinder and supports the potentiometer which is spring biased in contact with the conductive curve. The error in the relative position of the cylinder member and curve follower member are detected by the potentiometer and an error signal generated which controls the servo follow-up system to realign the position of one of the members. The potentiometer may be a center tapped type or a balanced bridge type, the former being preferred.

According to the present invention some of the foregoing described limitations in function generators are overcome by utilizing a potentiometer as the sensing element in the curve follower. This arrangement produces good servo resolution by achieving a broad linear response range. Furthermore, increased precision is obtained by simple circuitry without resorting to complex and costly mechanisms or electronic components.

A principal object of the invention is to provide a function generator of simple design capable of operating with a high degree of precision, stability, and accuracy.

A further object is to provide a function generator having a sensing element capable of producing an error signal which is linear with and proportional to the error over a broad range.

Another object is to provide a curve follower employing a potentiometer as a sensing element.

Other objects and many of the attendant advantages of this invention will be readily appreciated as the same becomes better understood by reference to the following detailed description when considered in connection with the accompanying drawings wherein.

Figure 1:
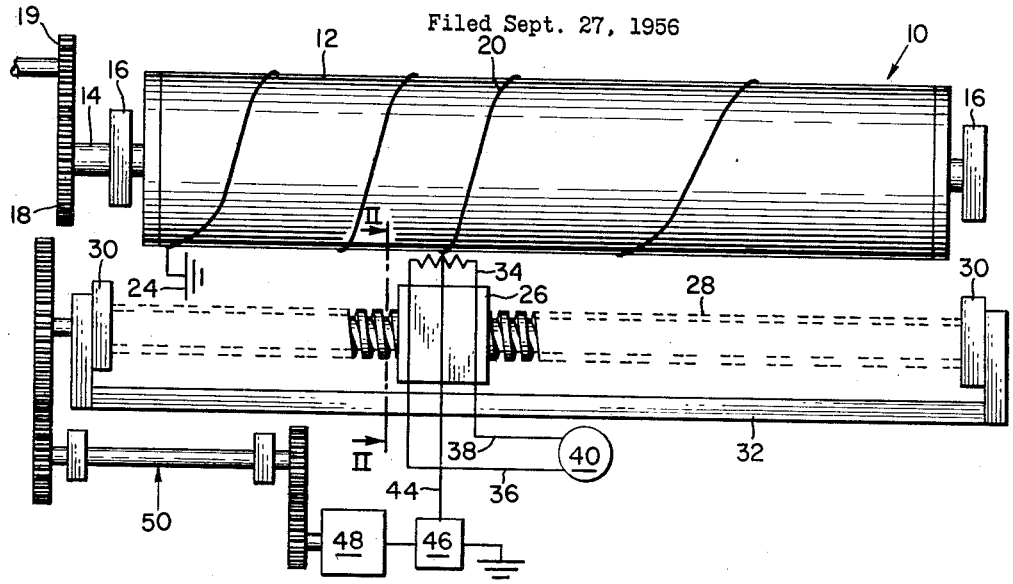
Fig. 1 is a diagrammatic plan view of a function generator.

Referring to the drawings where like reference numerals designate like or corresponding parts throughout the several views, there is shown generally in Fig. 1 a function generator 10 comprising a cylinder member 12 having a longitudinally extending shaft 14 rotatably supported on conventional bearings 16. Shaft 14 is connected to gears 18 and 19 whereby the cylinder may be driven or the angular position measured.

Figure 3:
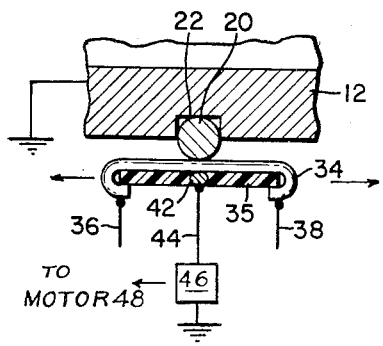
Fig. 3 is a sectional view of the potentiometer taken along line III—III of Fig. 2.

An electrically conductive line, such as wire 20, is wound around the periphery of cylinder 12 in a spiral configuration being a curve of the desired function as it might be represented on a two dimensional coordinate graph. Wire 20 is seated in a groove 22 machined in the cylinder as shown in Fig. 3, the groove also corresponding to the desired curve. The depth of the groove is less than the diameter of the wire permitting a portion of the wire to project beyond the cylinder surface to be electrically contacted. The particular configuration of the wire and groove forms no fundamental part of this invention since they can be replaced by a conductive paint or the like suitably applied to the periphery of the cylinder. As is shown in Fig. 1, wire 20 is grounded at 24.

A servo follower 26 follows wire 20 and transmits a mechanical quantity varying in accordance with the plotted function. Follower 26 is constructed as a nut being threadedly mounted on a lead screw 28, the axis of which is disposed in spaced parallel relation to the longitudinal axis of the cylinder. Lead screw 28 extends the length of the cylinder and is rotatably supported at each end on conventional bearings 30 mounted on a base 32. Follower 26 is constrained from rotation on the screw by abutment with base 32 so that rotation of lead screw 28 will drive the follower in a rectilinear path along the cylinder surface depending on the direction of screw rotation.

Figure 2:
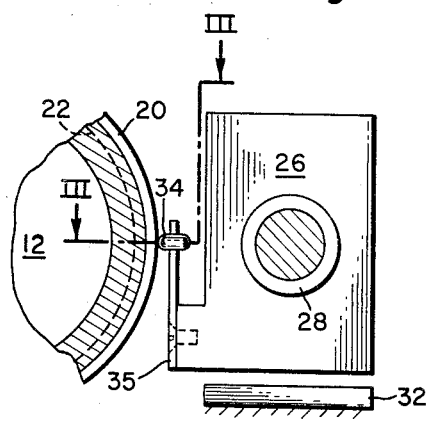
Fig. 2 is an enlarged partial cross section of the cylinder and the curve follower showing the potentiometer in contact with the conductive curve.

Detection of the error in the relative position of cylinder 12 and follower 26 is achieved by a potentiometer 34 which functions as a sensing element or pickup device. As shown in Figs. 2 and 3, potentiometer 34 is wrapped around the free end of a resilient, flat arm 35 of non-conductive material, such as micarta, secured at the other end to follower 26 in a manner to spring bias the potentiometer against the wire to assure continuous electrical contact. The potentiometer is preferably of center tapped construction of moderately heavy gauge resistance wire having good wear characteristics. The opposite ends of the potentiometer are connected by conductors 36 and 38 across a suitable A. C. or D. C. potential source at 40, and a center tap connection 42 is spot welded to an intermediate point in potentiometer and connected by conductor 44 to a conventional servo amplifier 46 of a follow-up mechanism A conventional two phase servo-motor 48 is controlled by the signal from amplifier 46 and is connected by suitable gearing 50 to lead screw 28 for driving follower 26 in either direction, according to the polarity of the electrical signal.

Figure 4:
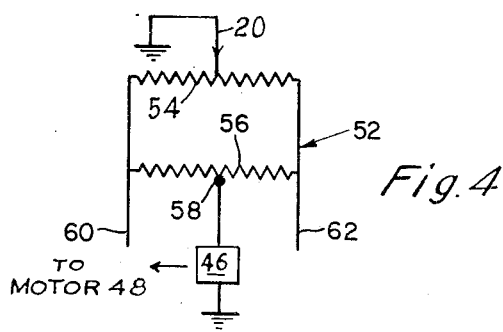
Fig. 4 is a diagrammatic view of a modified potentiometer.

A modified construction of potentiometer 52 is shown diagrammatically in Fig. 4 being a balanced bridge type, or what is frequently called a simulated center tap potentiometer. In this modification, a parallel arrangement of resistance legs 54 and 56 are provided, the former being maintained in electrical contact with wire 20, and the latter having a center tap connection at 58. Conductors 60 and 62, corresponding to conductors 36 and 38 of the prior potentiometer modification, can be connected across the same excitation source 40.

The operation of the function generator is apparent from Fig. 1 where it may be assumed that the desired function is represented by wire 20 wound on cylinder 12. Follower 26 has been servo driven on lead screw 28 to a neutral or null position where the center tapped connection 42 of potentiometer 34 is adjacent wire 20 and there is zero potential difference between the potentiometer center tap 42 and the grounded curve being followed. Obviously, in this position there is no error signal as the follower and cylinder are properly aligned, an input through gears 18 and 19 having driven cylinder 12, and the follower having been driven by the servo response system to follow the wire 20 and provide an output quantity. If now an input is again inserted by rotation of cylinder 12, wire 20 will be displaced from center tapped connection 42 and engage a point on either potentiometer leg, depending on the direction of cylinder rotation. For example, if the cylinder is rotated by the input to a new position where wire 20 engages a point intermediate in the right leg, an error voltage signal is generated proportional to the displacement which controls the servo follow-up mechanism and advances the follower along the lead screw in the same direction to a position where the center tapped connection 42 once again is adjacent to wire 20 to restore the balanced condition. The rotation of the lead screw or the linear disposition of the follower thereon in compliance with the error signal is the mechanical output of the function generator which has been varied by the plotted function of the curve. The input can be a continuous type or an on/off type depending on the particular application, and, of course the output will be of corresponding character. Obviously, the axes of the function may be reversed so that the rotation of the cylinder is servo positioned being the dependent variable, and the input drives the lead screw. The operation of the modification of Fig. 4 is similar to that described with reference to the other embodiment.

Use of a potentiometer as the sensing element results in a function generator capable of greater versatility being particularly suitable for generating asymptotic functions to a high degree of resolution and accuracy. This is achieved primarily by achieving a broad linear response and improved servo stability. These advantages are obtained by a simple and inexpensive arrangement.

Obviously many modifications and variations of the present invention are possible in the light of the above teachings. It is therefore to be understood that within the scope of the appended claims the invention may be practiced otherwise than as specifically described.

I claim:

1. A function generator comprising a rotatable support member carrying an electrical conductor thereon representing a predetermined curve, said conductor being maintained at constant potential, means for rotating said support member, a curve follower comprising a potentiometer sensing element an intermediate point of which tends to be maintained in contact with said conductor, means for movably supporting said follower, means for exciting said potentiometer by applying voltages of opposite polarity to the respective terminals thereof to generate an error signal when said conductor is out of contact with the said intermediate point of the potentiometer, and a servomeans for positioning one of said members in accordance with the error signal to again establish the said intermediate-point-contacting relationship.

2. The function generator of claim 1 wherein said potentiometer is mounted on the follower by a resilient support to bias the potentiometer in contact with the conductor.

3. The function generator of claim 1 wherein the curve follower comprises a center-tapped potentiometer.

4. The function generator of claim 1 wherein the curve follower comprises a balanced resistance bridge.

5. The function generator of claim 1, wherein both said potentiometer and said conductor have surfaces of generally cylindrical configuration in contact with one another, such that an essentially point contact is established between the generally cylindrical surface of said potentiometer and the cylindrical surface of said conductor.

References Cited in the file of this patent
UNITED STATES PATENTS

| 2,508,082 | Wald | May 16, 1950 |
| 2,598,937 | Parker | Jan. 3, 1952 |